(No Model.)

J. W. YOUNG.
KNOB ATTACHMENT.

No. 251,988. Patented Jan. 3, 1882.

WITNESSES
Wm A. Skinkle
Geo. W. Breck.

INVENTOR
John W. Young,
By his Attorney
Baldwin, Hopkins & Peyton.

UNITED STATES PATENT OFFICE.

JOHN W. YOUNG, OF STAMFORD, CONNECTICUT, ASSIGNOR TO THE YALE LOCK MANUFACTURING COMPANY, OF SAME PLACE.

KNOB ATTACHMENT.

SPECIFICATION forming part of Letters Patent No. 251,988, dated January 3, 1882.

Application filed October 10, 1881. (No model.)

*To all whom it may concern:*

Be it known that I, JOHN W. YOUNG, of Stamford, Connecticut, have invented a new and useful Improvement in Knob-Shanks and in the Mode of Attaching them to Spindles, of which the following is a specification, reference being had to the accompanying drawings.

The object of my invention is to provide a simple and cheap device for securely attaching knob-shanks to spindles that is readily adjustable to accommodate different thicknesses of doors.

Figure 1:
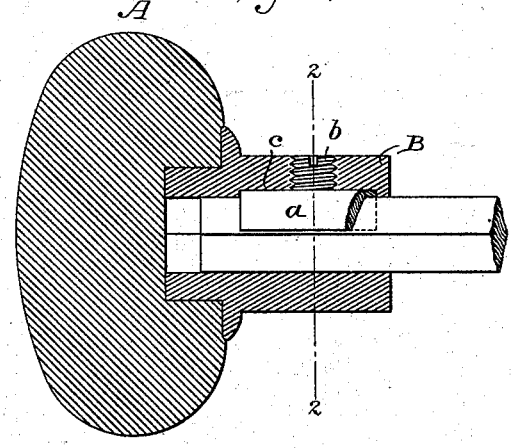
Figure 2:
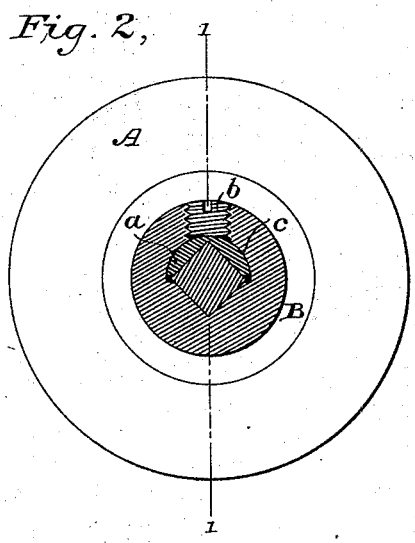

In the accompanying drawings, illustrating my invention, Figure 1 is a longitudinal section of a knob and knob-shank, showing the spindle in elevation; and Fig. 2 is a sectional view of the same on the line 2 2 of Fig. 1.

A is a knob, to which is secured in any suitable way the shank B, that is provided with an internal recess, $c$, adapted to contain a saddle, $a$, the lower right-angular surface of which forms the upper half of the spindle-socket. The saddle is inserted from the rear end of the shank, and is free to move up and down in the recess by the operation of the clamping-screw $b$. The length of the saddle is preferably somewhat less than that of the shank, and it straddles over the spindle as the latter enters its socket. When the spindle is properly adjusted the saddle is forced down upon it by the screw $b$, causing a pressure to be exerted on the spindle along the entire length of the saddle, thus firmly holding the spindle in place.

The under surface of the saddle and the spindle may be roughened, if desired, somewhat like a file, so that there will be a slight engagement under the pressure of the clamping-screw beyond mere frictional contact.

I am aware that it is not new to employ a shoe within a knob-shank to bear upon one side of a spindle by the force of a screw passing through the shank, and such a device is shown in United States Patent No. 15,367, of July 22, 1856; but my device is an improvement upon what is shown in that patent, because I provide a straddling saddle which covers about one half the surface of the spindle under it when in place and presses the opposite half of the spindle against the socket-walls of the shank. The result is that in my device there is a much larger bearing-surface of the spindle directly operated upon by screw-pressure, and the spindle is therefore more firmly held in place in its adjusted position. In the patent above referred to the shoe is placed upon one rectangular side of the spindle and the opposite side is forced against the socket-wall of the shank, whereas in my device the saddle covers two sides of the spindle, being straddled over one corner of it, and forces the two opposite sides of the spindle against the socket-walls of the shank.

Having thus described my invention, what I claim, and desire to secure by Letters Patent, is—

The combination of the knob-shank having the recess $c$ with the straddling saddle, the clamping-screw, and the spindle, substantially as hereinbefore set forth.

In testimony whereof I have hereunto subscribed my name this 13th day of August, A. D. 1881.

JOHN W. YOUNG.

Witnesses:
GEO. E. WHITE,
SCHUYLER MERRITT.